(12) United States Patent
Buffinga et al.

(10) Patent No.: US 9,848,736 B2
(45) Date of Patent: Dec. 26, 2017

(54) MULTIPLE-COMPARTMENT COFFEE MILL HOPPER FOR A COFFEE MILL

(71) Applicant: KONINKLIJKE PHILIPS N.V., Eindhoven (NL)

(72) Inventors: Jan Buffinga, Eindhoven (NL); Yde Johannes Venema, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 94 days.

(21) Appl. No.: 14/888,783

(22) PCT Filed: Apr. 30, 2014

(86) PCT No.: PCT/IB2014/061112
§ 371 (c)(1),
(2) Date: Nov. 3, 2015

(87) PCT Pub. No.: WO2014/181225
PCT Pub. Date: Nov. 13, 2014

(65) Prior Publication Data
US 2016/0073825 A1    Mar. 17, 2016

(30) Foreign Application Priority Data

May 8, 2013 (EP) .................................. 13167135
May 17, 2013 (EP) .................................. 13168248

(51) Int. Cl.
*B67D 7/06* (2010.01)
*A47J 42/50* (2006.01)
*B65D 83/00* (2006.01)

(52) U.S. Cl.
CPC .......... *A47J 42/50* (2013.01); *B65D 83/0005* (2013.01)

(58) Field of Classification Search
CPC .. A47J 42/50; A47J 42/52; A47J 42/00; A47J 42/38
(Continued)

(56) References Cited

U.S. PATENT DOCUMENTS 5,186,399 A    2/1993 Knepler
RE34,382 E *  9/1993 Newnan .................. A47J 31/42
                                                   222/307
(Continued)

FOREIGN PATENT DOCUMENTS

CH    690609 A5    11/2000
DE    451326 C     10/1927
(Continued)

*Primary Examiner* — Jeremy W Carroll

(57) ABSTRACT

Coffee mill hopper assembly (1), comprising a hopper (10) with multiple compartments (18a, 18b) for storing coffee beans and at least one outlet (22) through which coffee beans may be released from the respective compartments, and a compartment selector (30) comprising a rotatable control knob for adjusting the position of a closure member (36) that cooperates with the at least one outlet (22) to provide for at least one outflow aperture that, depending on the rotational position of the closure member, selectively enables a release of coffee beans. The compartment selector (30) further comprises two toothed members that are rotationally locked to the control knob (34) and the hopper (10), respectively, wherein at least one of said toothed members (50a, 50b) is movably arranged and spring-biased to force the teeth (54a, 54b) of the toothed members towards each other in a meshing relationship.

12 Claims, 5 Drawing Sheets

(58) Field of Classification Search
USPC .......................... 222/144.5; 99/279; 241/100
See application file for complete search history.

(56) References Cited

U.S. PATENT DOCUMENTS

| | | | | |
|---|---|---|---|---|
| 5,458,295 A | * | 10/1995 | Haber | ...................... A47J 42/50 |
| | | | | 241/100 |
| 5,697,528 A | * | 12/1997 | Haber | ...................... A47J 42/50 |
| | | | | 222/134 |
| 5,845,857 A | | 12/1998 | Haber | |
| 2006/0137533 A1 | * | 6/2006 | Wise | ................... A47J 31/0576 |
| | | | | 99/279 |

FOREIGN PATENT DOCUMENTS

| | | |
|---|---|---|
| DE | 594983 C | 3/1934 |
| GB | 2298148 A | 8/1996 |

* cited by examiner

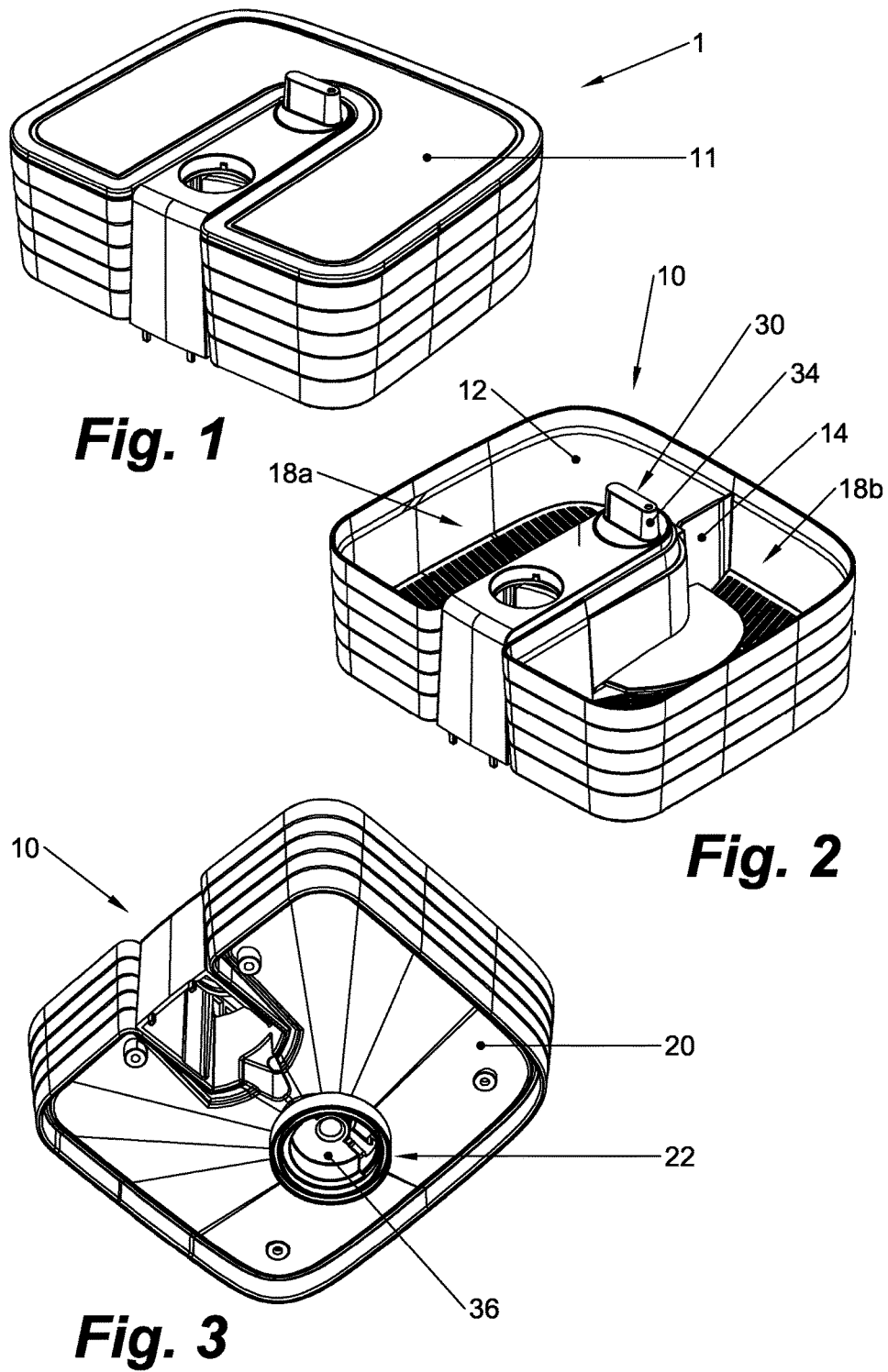

MULTIPLE-COMPARTMENT COFFEE MILL HOPPER FOR A COFFEE MILL

This application is the U.S. National Phase application under 35 U.S.C. §371 of International Application No. PCT/IB2014/061112, filed on Apr. 30, 2014, which claims the benefit of European Application No. 13167135.6 filed on May 8, 2013 & European Application No. 13168248.6 filed on May 17, 2013. These applications are hereby incorporated by reference herein.

FIELD OF THE INVENTION

The present invention relates to the field of coffee mills, and more in particular to a multiple-compartment coffee mill hopper suitable for use in a coffee mill.

BACKGROUND OF THE INVENTION

UK patent application publication GB 2,298,148-A discloses a coffee mill including a coffee mill hopper. The hopper has two coffee bean compartments and a central outlet in its bottom, which outlet is common to both compartments. The outlet is covered by an apertured cap inside of which a rotatable inverted cup-shaped closure fits that extends to a control knob at the top of the hopper. The cup-shaped closure has an aperture in its side, which cooperates with the apertured cap, so that the rotational position of the cup-shaped closure controls whether coffee beans flow out of the hopper through the common outlet from a first, a second, or both of the compartments.

DE 594983 discloses a coffee mill hopper assembly according to the preamble of claim 1.

SUMMARY OF THE INVENTION

A not so obvious drawback of the coffee mill hopper of GB'148 is that it allows a user unlimited flexibility in selecting and setting the rotational position of the control knob. Indeed, it seems to provide advantageously flexible control over the outflow opening through which coffee beans from one or both compartments may flow out of the hopper, and thus over the strength and/or blend ratio of the coffee to be brewed. Some selectable rotational positions of the control knob, however, are preferably avoided, for instance because their corresponding outflow opening sizes are fairly small and likely to cause congestion, or to result in undesirably weak coffee. In addition, the control knob does not provide for any feedback that affirms the selection of a suitable rotational position, which is undesirable from a usability point of view. Furthermore, the rotational position of the cup-shaped closure cannot be fixed. As a result, it may inadvertently change under the vibrating action of the grinder that is attached to the hopper.

It is an object of the present invention to provide for a coffee mill hopper assembly that overcomes or mitigates the aforementioned issues.

To this end, a first aspect of the present invention is directed to a coffee mill hopper assembly. The assembly may comprise a hopper defining a plurality of compartments for storing coffee beans, and at least one outlet through which coffee beans from the respective compartments may be released from the hopper. The assembly may also comprise a compartment selector. The compartment selector may include a shaft that interconnects a control knob and a closure member, and that is rotatably mounted to the hopper such that a rotational position of the closure member (relative to the hopper) is adjustable by rotating the shaft around its axis through rotation of the control knob. The closure member may be arranged to cooperate with the at least one outlet of the hopper to provide at least one outflow aperture that, depending on the rotational position of the closure member, selectively enables a release of coffee beans from at least one compartment. The compartment selector may further comprise a first toothed member that is rotationally locked to the shaft, and a second toothed member that is rotationally locked to the hopper. At least one of the toothed members may be movably arranged and be spring-biased to force the teeth of the toothed members towards each other in a meshing relationship.

The compartment selector of the presently disclosed coffee mill hopper assembly may thus include two toothed members that are both movable relative to each other and spring-biased towards each other. When the compartment selector is free of manual control, the teeth of the toothed members may be forced together into one of a plurality of discrete meshing positions, each of which corresponds to a pre-determined and in itself suitable rotational position of the closure member. Then, when adjustment of the rotational position of the closure member is desired, a user may turn the control knob. In doing so, he must overcome the spring-bias that forces the toothed members together. If sufficient torque is applied and the spring-bias is overcome, the toothed members may rotate relative to each other while they, at at least their meshing teeth, are forced apart (against the spring-bias). This relative rotation of the toothed members may continue until the teeth of the respective toothed members are again in meshable rotational registry, at which point the toothed members snap into another meshing position under the action of the spring force.

Because the meshing positions of the toothed members may all be configured to correspond to suitable rotational positions of the closure member, the risk of selecting unsuitable rotational positions of the closure member may be eliminated. Furthermore, the spring-biased interaction between the toothed members provides for tactile feedback to the user via the control knob to affirm the selection of a suitable rotational position of the closure member. In addition, the spring-biased interaction also ensures that any meshing position selected by the user and assumed by the two toothed members is practically locked, and cannot be altered accidentally by vibrations of a grinder.

These and other features and advantages of the invention will be more fully understood from the following detailed description of certain embodiments of the invention, taken together with the accompanying drawings, which are meant to illustrate and not to limit the invention.

BRIEF DESCRIPTION OF THE DRAWINGS

FIG. 1 is a schematic top perspective view of an exemplary embodiment of a coffee mill hopper assembly according to the present invention;

FIG. 2 is a schematic top perspective view of the coffee mill hopper assembly of FIG. 1 from which the lid of the hopper has been removed, such that the interior coffee bean compartments are visible;

FIG. 3 is a schematic bottom perspective view of the coffee mill hopper assembly of FIG. 1;

DETAILED DESCRIPTION

Figure 4:
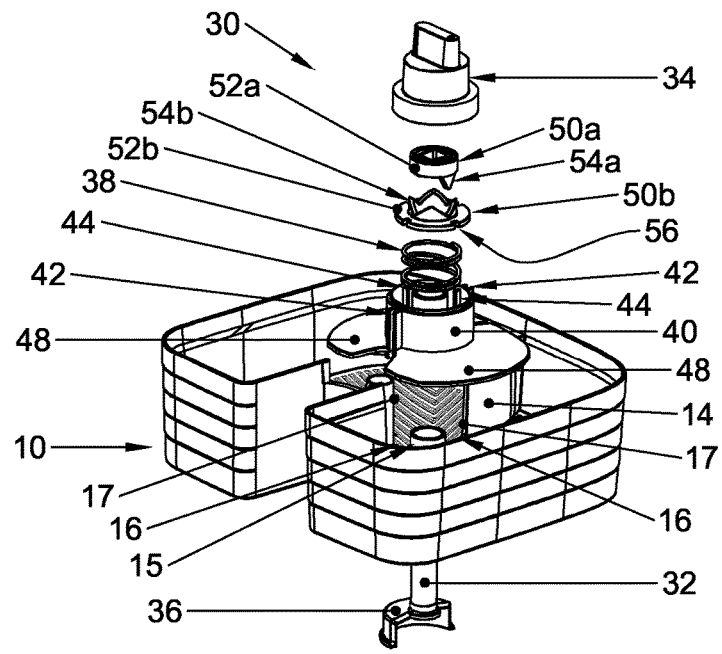
FIG. 4 is a schematic partly exploded top perspective view of the coffee mill hopper assembly of FIGS. 1-3, illustrating the construction of the compartment selector.
Figure 5:
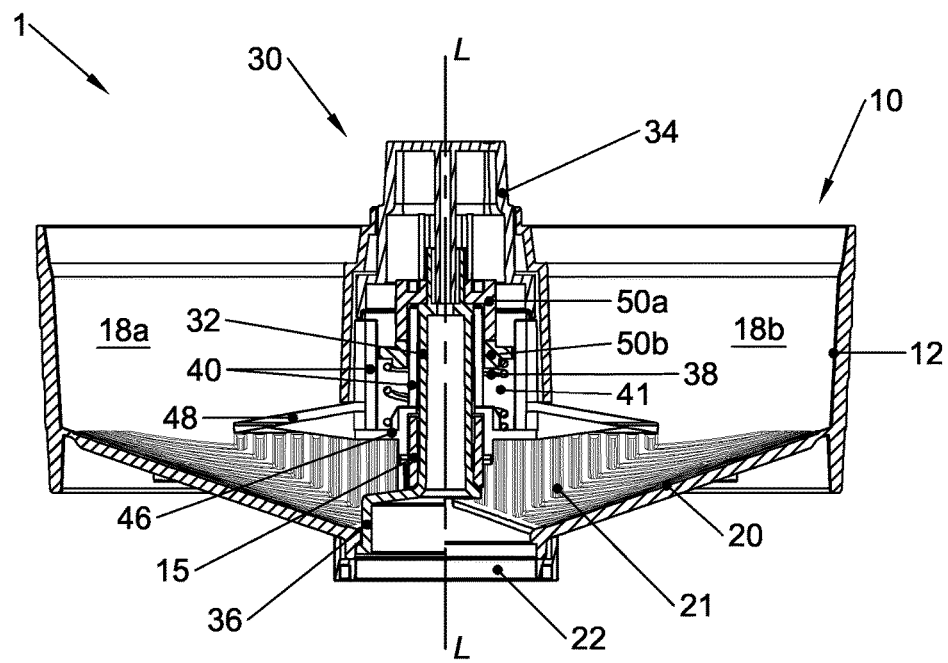
FIG. 5 is a schematic cross-sectional side view of the coffee mill hopper assembly of FIGS. 1-3, illustrating the construction of the compartment selector.

FIGS. 1-6 schematically illustrate in various views an exemplary embodiment of a coffee mill hopper assembly 1 according to the present invention. Below, the coffee mill hopper assembly according to the present invention will be elucidated in general terms, where appropriate with reference to the embodiment depicted in FIGS. 1-6.

The presently disclosed coffee mill hopper assembly 1 may comprise a hopper 10. The hopper 10 may include a bottom wall 20, a circumferential side wall 12 that extends in a generally upward, possibly outwardly oblique direction from the bottom wall 20, and a top wall 11 (shown only in FIG. 1) that meets with the side wall 12 to close off an interior of the hopper 10. The top wall 11 may preferably be detachably or hingeably connected to the side wall 12, such that it forms a lid or cover that is easily removable to enable refilling of the hopper 10. The hopper 10 may further include one or more partitions 14 that divide the interior of the hopper 10 into a plurality of compartments 18a, 18b for the temporary storage of coffee beans. In the embodiment of FIGS. 1-6, the hopper 10 includes one partition 14 that divides the interior of the hopper 10 into two symmetric compartments 18a, 18b. It is contemplated, however, that different embodiments of the hopper 10 may have a different number or configuration of partitions to define more than two compartments, e.g. three or four.

The bottom wall 20 of the hopper 10 may include at least one outlet or outlet opening 22 through which coffee beans may be released from the compartments 18a, 18b of the hopper 10. In one embodiment, each individual compartment 18a, 18b may have its own dedicated outlet via which only coffee beans from the respective compartment may be released. In another embodiment, such as the embodiment of FIGS. 1-6, at least two compartments 18a, 18b may share a common outlet 22 via which coffee beans from (all) the respective at least two compartments may be released. In such an embodiment, the common outlet 22 may typically be arranged in the bottom wall 20 and extend below/underneath the partition(s) 14 that separate(s) the compartments 18a, 18b sharing the common outlet 22. As in the depicted embodiment, the bottom wall 20 may slope downwardly towards the at least one outlet 22, so as to bias the coffee beans towards it. The inner surface of the bottom wall 20 may also be provided with a plurality of ridges or ribs 21 to prevent coffee beans from sticking to the bottom wall 20, and thus to promote the outflow/release of coffee beans from the compartments 18a, 18b during operation.

The coffee mill hopper assembly 1 may further include a compartment selector 30.

The compartment selector 30 may include a shaft 32. The shaft 32 may be bearing mounted to the hopper 10 such that it is rotatable around its longitudinal axis L. In the depicted embodiment, the partition 14 of the hopper 10 defines a bushing or tube 15 that is dimensioned to receive the shaft 32 in a plain bearing arrangement, wherein an inner surface of the bushing 15 provides for a bearing surface and an outer surface of the shaft slides over the bearing surface when the shaft 32 is rotated. Although the plain bearing arrangement is simple and economical, it is understood that different types of bearings, such as rolling-element bearings, may alternatively be used to rotatably mount the shaft 32 to the hopper 10.

At its upper end, the shaft 32 may be operably connected to a rotatable knob 34. The knob 34 may preferably be at least partially arranged at an outside of the coffee mill hopper assembly 1, such that it is manually accessible during operation.

At its lower end the shaft 32 may connect to a closure member 36 that is configured to cooperate with the at least one coffee bean outlet 22 of the hopper 10, such that it wholly or partly closes off the at least one outlet 22 depending on the rotational position of the shaft 32. In the depicted embodiment, the closure member 36 is shaped as an inverted cup of which 180° is absent. The inverted cup has an outer diameter that matches an inner diameter of the common outlet 22 in which it is arranged. An upper or top side of the cup-shaped closure member 36, which connects to the shaft 32, is slightly slanted downwards to direct coffee beans away from the central axis L of the shaft 32, and to ensure that the upper side does not form a ledge on which coffee beans can rest. A radially inner portion of the slanted upper side of the closure member 36 may smoothly bear against the correspondingly tapered lower circumferential edge of the bushing 15.

It is contemplated that the closure member 36 may take different forms in alternative embodiments. In an embodiment having a hopper 10 with n compartments 18 that are rotationally symmetrically arranged around and share a common outlet 22, for example, an absent angular part of a cup-shaped closure member 36 may generally cover (360/n)°. Accordingly, the compartment selector 30 for a hopper 10 whose interior is divided into three compartments may include an inverted cup-shaped closure member of which (360°/3=) 120° is absent. Furthermore, the closure member 36 need not be inverted cup-shaped. In one embodiment, for instance, the closure member may include a planar disc that abuts the portion of the bottom wall 18 comprising the at least one outlet 22, and that defines one or more openings that may wholly or partly register with the at least one outlet 22 depending on the rotational position of the shaft 32.

The compartment selector 30 may further include two toothed members 50a, 50b. In this text, the term 'tooth' may be construed broadly to include any kind of tooth-like (positive) protrusion or (negative) recession, irrespective of whether it is commonly referred to as a tooth, a cam, a stud, a pin, or, alternatively, a recess, notch, or the like, and irrespective of whether the tooth itself is a separate part (in the case of a positive tooth) or a protrusion/recession that is part of another, typically larger part. The term 'toothed member' may be construed to refer to a part or element that either forms or is provided with one or more teeth that are arranged for meshing engagement with the one or more teeth of another toothed member. A toothed member may but need not be a separate or separately manufactured part; i.e. it may be integrally formed with a larger part. It should be appreciated that two toothed members may be meshable because the positively defined tooth/teeth (i.e. projections) of one toothed member may fit in the negatively defined tooth/teeth (i.e. recesses) of the other toothed member; these negatively defined teeth may, of course, in turn be defined between the positively defined teeth of the latter. Accordingly, negatively and positively defined teeth are each others complement, and this text uses a broad interpretation of the terms 'tooth' and 'toothed member' to cover such positive and negative alternatives.

A first 50a of the toothed members may be rotationally locked to the shaft 32, such that it rotates in unison therewith. A second of the toothed members 50b may be rotationally locked to the hopper 10, such that it rotates in unison with the hopper 10. For the purpose of the present invention, however, the hopper 10 may be regarded stationary, which means that the second toothed member 50b and its teeth may be considered rotationally fixed relative to the axis of rotation L of the shaft 32. Furthermore, at least one of the toothed members 50a, 50b may be wholly or partly movably, in particular translatably, arranged relative to the shaft 32. In one embodiment (such as the depicted embodiment) the at least one movably arranged toothed member may be movably arranged along/parallel to the axis L of the shaft 32. In another embodiment, the at least one movably arranged toothed member may be movably arranged in a radial direction relative to the axis L as of the shaft 32. The two toothed members 50a, 50b may be arranged such that at least some of their respective teeth 54a, 54b face each other, and the at least one movably arranged toothed member 50a, 50b may be spring-biased to force the facing teeth 54a, 54b of the toothed members 50a, 50b towards each other and into meshing engagement. For spring-biasing the at least one movably arranged toothed member, a spring of any suitable kind may be used.

To facilitate the desired interaction between the teeth 54a, 54b of the respective toothed members 50a, 50b, the tooth/teeth of at least one of the toothed members 50a, 50b may be 'tangentially ramped'. That is, each of the teeth of the at least one toothed member may include at least one tangential flank or contact surface that gradually slopes in that an axial and/or radial coordinate of the flank's surface varies gradually with an increase in the tangential coordinate. The tangentially ramped teeth may preferably be generally wedge-shaped, and thus have two straight or curved sloping flanks that meet in an apex, so as to facilitate bi-directional relative rotational movement of the toothed members.

As mentioned, both toothed members 50a, 50b may define at least one tooth 54a, 54b. The number of teeth on the respective toothed members 50a, 50b may but need not be the same. In a preferred embodiment, at least one of the toothed members 50a, 50b may define 2n teeth, wherein n denotes the number of hopper compartments 18a, 18b. As will become clear below, the 2n teeth may provide for 2n meshing positions of the toothed members 50a, 50b, and hence for 2n selectable rotational positions of the closure member 36. These 2n rotational positions of the closure member 36 may advantageously allow for the selection of each individual compartment 18a, 18b (n positions), and, in addition, for the combined/mixed selection of mutually adjacent compartments (another n positions). When one toothed member 50a, 50b has 2n teeth 54a, 54b, the other toothed member may preferably have a same or smaller number of teeth.

The teeth 54a, 54b of a toothed member 50a, 50b that extends around the axis of rotation L of the shaft may typically be substantially identical, and be equidistantly spaced apart in the circumferential or tangential direction (i.e. around axis L). It is noted that the teeth 54a on the first toothed member 50a may but need not have a same shape as the teeth 54b on the second toothed member 50b. The respective teeth 54a, 54 may, however, preferably be complementarily shaped to enable a mutually fitting engagement.

In the depicted exemplary coffee mill hopper assembly 1, the above-described general principles are embodied as follows.

Each of the toothed members 50a, 50b is a separately manufactured part, comprising an annular base member 52a, 52b that is coaxially arranged around the shaft 32. The separate nature and annular shape of the toothed members 50a, 50b facilitate the cost-effective construction and assembly of the compartment selector 30, but are no necessity. In a variation of the depicted embodiment, for example, the first toothed member 50a may be integrally formed with the shaft 32.

The first toothed member 50a defines two identical downwardly pointing wedge-shaped teeth 54a, which are diametrically arranged on a lower side of the first annular base member 52a. The second toothed member 50b defines four identical upwardly pointing wedge-shaped teeth 54b, which are arranged on an upper side of the second annular base member 52b in an equidistantly spaced apart fashion. The teeth 54a, 54b are complementarily shaped, such that each first tooth 54a neatly fits in between each two circumferentially adjacent second teeth 54b.

To properly mount the various parts of the compartment selector 30 to the hopper 10, a guide member 40 is provided. The guide member 40 includes two coaxially arranged cylindrical or cylinder jacket-shaped walls, which are connected at their lower ends by a bottom wall 46, and spaced apart to define an annular, axially extending space 41 between them. The bottom wall 46 and the inner cylindrical wall of the guide member together define a radially-stepped axially extending bore, the lower and wider part of which is configured to receive the top end of the bushing 15 of the partition 14, such that the guide member 40 can be coaxially mounted on top of the bushing 15 (best seen in FIG. 5). The partition 14 further defines two elongate slots 16 on either side of the bushing 15 to allow the guide member 40 to be slid over it (best seen in FIG. 4). Two straight and axially extending guide grooves 42, diametrically arranged on an outside of the outer cylindrical wall of the guide member 40, cooperate with elongate axially extending edges 17 of the slots 16 to facilitate the installation of the guide member 40 during assembly, and to rotationally lock the guide member 40 to the hopper 10. On an inside of the outer cylindrical wall of the guide member 40, four straight, axially extending guide ribs 44 are provided at 90°-intervals around the axis L. Corresponding recesses 56 for reception of the guide ribs 44 are provided in an outer circumferential edge of the annular base member 52b of the second toothed member 50b.

The first toothed member 50a is fixedly connected to the shaft 32 at a point just above the top end of the inner cylindrical wall of the guide member 40 (which inner wall forms an extension of the bushing 15), with its teeth 54a pointing downwards. A radially inner portion of a lower side of the annular base member 52a of the first toothed member 50a smoothly bears against an upper circumferential edge of the inner cylindrical wall of the guide member 40, and thus cooperates with the radially inner portion of the upper side of the inverted cup-shaped closure member 36 bearing against the lower circumferential edge of the bushing 15 to axially fix the shaft 32 in the bushing 15.

The second toothed member 50b is rotationally locked to the hopper 10 while being slidably movable along the central axis L of the shaft 32. To this end, it is snugly arranged inside the annular space 41 between the cylindrical walls of the guide member 40, such that the recesses 56 in the outer circumferential edge of its annular member 52b receive and engage the guide ribs 44 on the inside of the guide member 40. A coil spring 38, disposed between a lower side of the second toothed member 50b and the bottom wall 46 the guide member 40, serves to urge or bias the second toothed member 50b upwards along the axis L, into contact with the first toothed member 50a. At its lower end, the guide member 40 may be provided with one or more wings 48, typically one per hopper compartment 18a, 18b. Each wing 48 may extend radially outwards at a downward slope, and so help to direct coffee beans away from the central axis L and 'around' the closure member 36 in order to promote their smooth outflow through the outlet 22.

Except for the spring 38, which may preferably be made of metal, the parts of the coffee mill hopper assembly 1 may be economically manufactured from plastic, for instance through injection molding.

Now that the construction of the coffee mill hopper assembly of the present invention has been described in some detail, attention is invited to its operation.

Figures 6A, 6B:
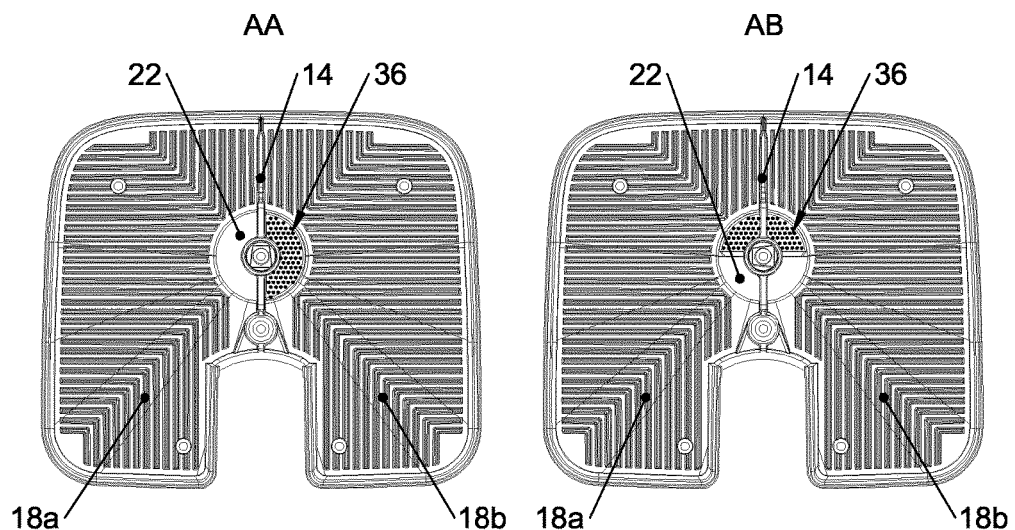
FIGS. 6A-D is a series of top views of the coffee mill hopper assembly of FIGS. 1-5, wherein the control knob of the compartment selector has been removed to illustrate the discretely selectable rotational positions of the closure member.
Figures 6C, 6D:
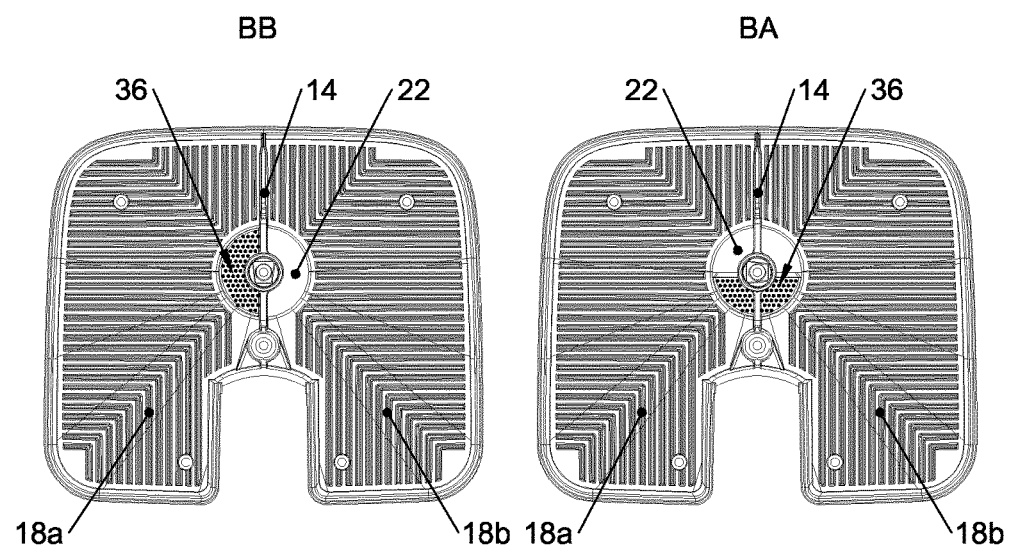
Figure 7:
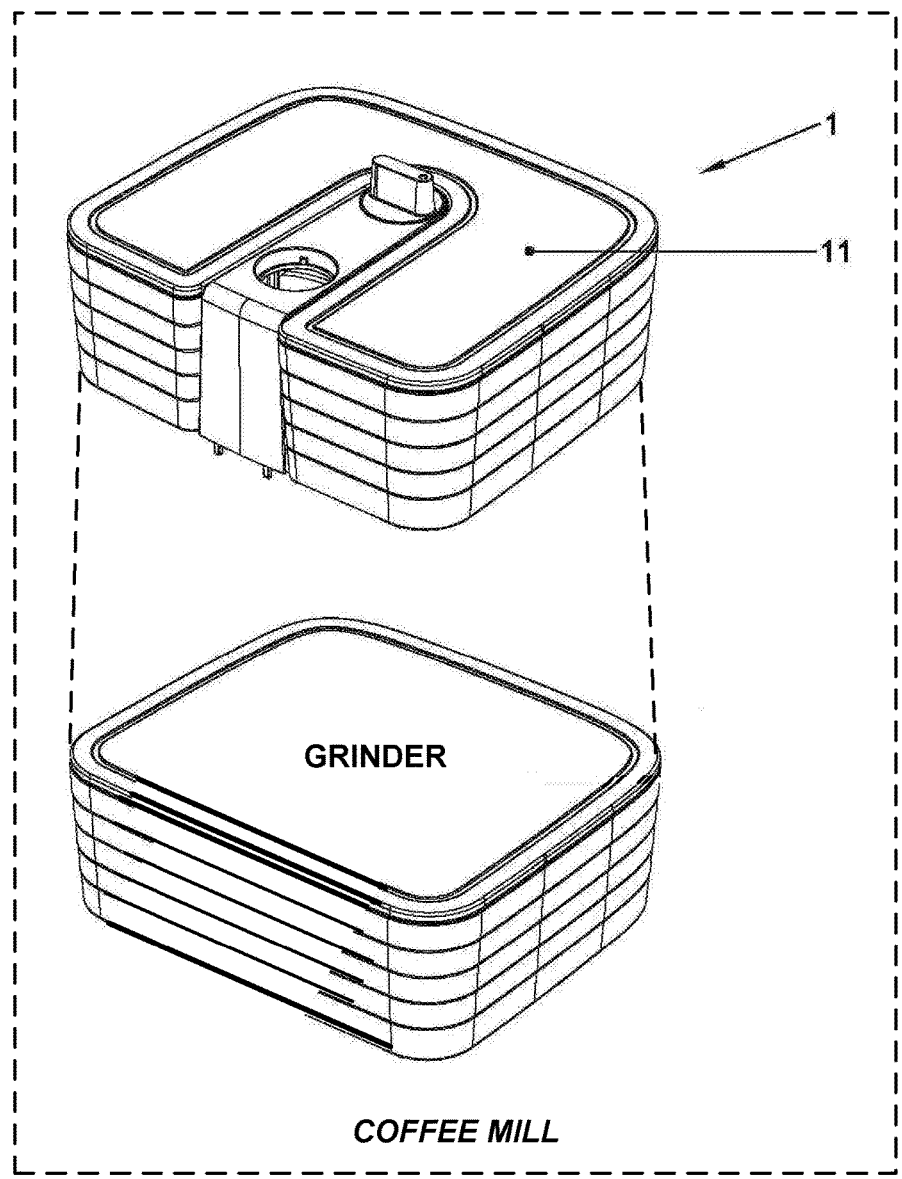
FIG. 7 is a schematic perspective view of a coffee mill that comprises the coffee mill hopper assembly of FIGS. 1-3, and a grinder that is configured to grind coffee beans released from the coffee mill hopper assembly through the at least one outlet thereof.
Figure 8:
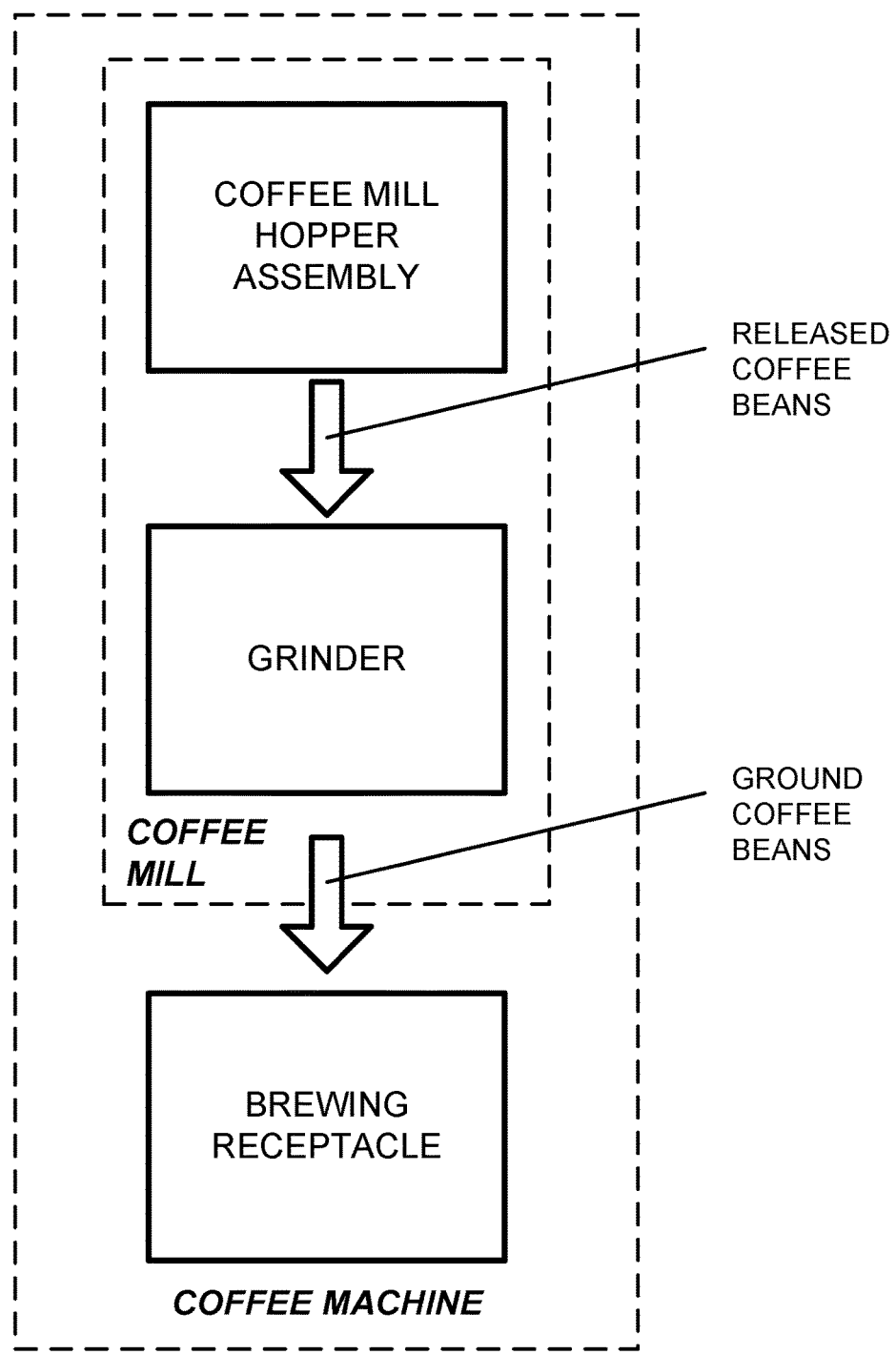
FIG. 8 is a schematic diagram view of a coffee machine that comprises the coffee mill of FIG. 7 and a brewing receptacle for receiving ground coffee beans output via the grinder.

When the compartment selector 30 of the depicted coffee mill hopper assembly 1 is free of manual control, the teeth of the toothed members 50a, 50b are axially forced together by the spring 38 into one of four discrete meshing positions. Each of these meshing positions corresponds to a predetermined and in itself suitable rotational position of the closure member 36. FIGS. 6A-D schematically illustrate these four discretely selectable rotational positions of the closure member 36, which, for ease of recognition, is provided with a dot-hatch pattern. In the position of FIGS. 6A and 6B, the closure member 36 cooperates with the common outlet 22 (and the partition 14) to define large, half-circular outflow openings that are exclusively associated with compartments 18a and 18b, respectively. In the positions of FIGS. 6C and 6D, on the other hand, the closure member 36 cooperates with the common outlet 22 (and the partition 14) to define two smaller, quarter-circular outflow openings, one of which is associated with compartment 18a, and one of which is associated with compartment 18b. The rotational positions of FIGS. 6A and 6B thus allow for the outflow of coffee beans from compartment 18a or compartment 18b, while the rotational positions allow for the concurrent or mixed outflow of coffee beans from both compartment 18a, 18b.

When adjustment of the rotational position of the closure member 36 is desired, for instance a change of its position from that of FIG. 6A to that of FIG. 6B, a user may turn the control knob 34 counter-clockwise (as seen in the top view of FIG. 6). In doing so, he must overcome the spring-bias that forces the toothed members 50a, 50b together in the meshing position that corresponds to the rotational position of the closure member 26 shown in FIG. 6A. If sufficient torque is applied and the spring-bias is overcome, the toothed members 50a, 50b may rotate relative to each other while they are axially forced apart (against the spring-bias). This relative rotation of the toothed members 50a, 50b may continue until the teeth of the respective toothed members are again in meshable rotational registry, at which point the toothed members snap into the meshing position that corresponds to the rotational position of FIG. 6B under the action of the spring force.

Because the meshing positions of the toothed members 50a, 50b are all configured to correspond to suitable rotational positions of the closure member 36, as illustrated in FIG. 6, the risk of selecting unsuitable rotational positions of the closure member is eliminated. Furthermore, the spring-biased interaction between the toothed members 50a, 50b provides for tactile feedback to the user via the control knob 34 to affirm the selection of a suitable rotational position of the closure member. And the spring-biased interaction also advantageously ensures that any meshing position selected by the user and assumed by the two toothed members 50a, 50b is practically locked, and cannot be altered accidentally by vibrations of a grinder.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. For example, according to one embodiment, a coffee mill comprises a coffee fill hopper assembly and a grinder operably connected to the coffee mill hopper assembly, wherein the grinder is configured to grind coffee beans released from the coffee mill hopper assembly through the at least one outlet. According to another embodiment, a coffee machine comprises the coffee mill and a brewing receptacle for receiving ground coffee beans output via the grinder. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

The invention claimed is:
1. A coffee mill hopper assembly, comprising:
a hopper defining a plurality of compartments for storing coffee beans, and at least one outlet through which coffee beans may be released from the respective compartments of the hopper;
a compartment selector, comprising a shaft interconnecting a control knob and a closure member, said shaft being rotatably mounted to the hopper such that a rotational position of the closure member is adjustable by rotating the shaft around its axis (L) through rotation of the control knob, and wherein the closure member is arranged to cooperate with the at least one outlet of the hopper to provide at least one outflow aperture that, depending on the rotational position of the closure member, selectively enables a release of coffee beans from at least one compartment;
characterized in that the compartment selector further comprises a first toothed member that is rotationally locked to the shaft and a second toothed member that is rotationally locked to the hopper, at least one of said toothed members being movably arranged relative to the shaft and spring-biased to force the teeth of the toothed members towards each other in a meshing relationship.

2. The coffee mill hopper assembly according to claim 1, wherein at least one of the first and second toothed members comprises a plurality of teeth that are substantially identical and equidistantly spaced apart in a circumferential direction around the axis (L) of the shaft.

3. The coffee mill hopper assembly according to claim 1, wherein one of said toothed members has 2n teeth, n being the number of compartments, while the other of said toothed members has a number of teeth that is equal to or less than 2n.

4. The coffee mill hopper assembly according to claim 1, wherein the two toothed members define at least three meshing positions, wherein:
- in a first meshing position, the closure member cooperates with the at least one outlet of the hopper to provide at least one outflow aperture that enables a release of coffee beans exclusively from a first of said compartments;
- in a second meshing position, the closure member cooperates with the at least one outlet of the hopper to provide at least one outflow aperture that enables a release of coffee beans exclusively from a second of said compartments; and
- in a third meshing position, the closure member cooperates with the at least one outlet of the hopper to provide at least one outflow aperture that enables a concurrent release of coffee beans from both the first and the second of said compartments.

5. The coffee mill hopper assembly according to claim 1, wherein said at least one movably arranged toothed member is movably arranged in a radial direction relative to the axis (L) of the shaft.

6. The coffee mill hopper assembly according to claim 1, wherein said at least one movably arranged toothed member is movably arranged in a direction parallel to the axis (L) of the shaft.

7. The coffee mill hopper assembly according to claim 1, wherein the first toothed member is fixedly attached to the shaft.

8. The coffee mill hopper assembly according to claim 6, wherein the second toothed member includes an annular base member that is coaxially arranged with the shaft, and movable along the axial direction (L) thereof.

9. The coffee mill hopper assembly according to claim 1, wherein the compartment selector includes a coil spring that is arranged coaxially with the shaft, and that urges the second toothed member towards the first toothed member.

10. The coffee mill hopper assembly according to claim 1, wherein the plurality of compartments share a common outlet, and wherein the closure member is arranged to cooperate with the common outlet.

11. A coffee mill, comprising:
- a coffee mill hopper assembly according to claim 1; and
- a grinder operably connected to the coffee mill hopper assembly, and configured to grind coffee beans released from the hopper through the at least one outlet thereof.

12. A coffee machine, comprising:
- a coffee mill according to claim 11; and
- a brewing receptacle for receiving ground coffee beans output via the grinder.

* * * * *